C. C. VAN DER VALK & F. M. VAN PANTHALEON BARON VAN ECK.
LOCK NUT.
APPLICATION FILED MAY 24, 1916.

1,223,911.  Patented Apr. 24, 1917.

Inventors
Christiaan Cornelis van der Valk
François Marinus van Panthaleon
Baron van Eck

UNITED STATES PATENT OFFICE.

CHRISTIAAN CORNELIS VAN DER VALK, OF THE HAGUE, AND FRANÇOIS MARINUS VAN PANTHALEON BARON VAN ECK, OF ROTTERDAM, NETHERLANDS, ASSIGNORS TO CAREL OTTO HEUVELINK, OF THE HAGUE, NETHERLANDS.

LOCK-NUT.

1,223,911.    Specification of Letters Patent.    Patented Apr. 24, 1917.

Application filed May 24, 1916. Serial No. 99,530.

*To all whom it may concern:*

Be it known that we, CHRISTIAAN CORNELIS VAN DER VALK and FRANÇOIS MARINUS VAN PANTHALEON BARON VAN ECK, both subjects of the Queen of the Netherlands, respectively residing at The Hague and Rotterdam, Netherlands, have invented certain new and useful Improvements in Lock-Nuts, of which the following is a specification.

This invention relates to lock nuts, the object of the invention being to provide an improved lock nut of very simple construction, cheap to manufacture, capable of ready application and efficient in preventing the removal or loosening of a nut from its bolt. The improved lock nut consists in the construction and combination hereinafter described and claimed. Substantially the invention consists in providing on one of the end faces of the nut a projecting marginal lug the outer surface of which preferably coincides with one or more sides of the nut, while its inner surface is curved, preferably to cylindrical form, the axis of this cylindrical surface lying opposite the projecting lug, and being so located that the axis of the nut lies between it and the said lug. The lug will in this form surround about one fourth part of the circumference of the bolt or more, leaving a space between it and the bolt. This space gradually diminishes in width up to a point where it is narrowest and this point is in a plane laid through both of the above mentioned axes, and in this plane there should preferably also lie a corner of the nut, for reasons stated hereafter.

The space between the lug and the bolt is adapted to receive a locking key which is so shaped as to engage between the threads of the bolt and to bear against the inner surface of the lug. When the nut is screwed down in position the key is inserted sidewise in the said space and is jammed into the space which grows very gradually narrower. The nut is then locked in that position without the necessity of turning the nut in a direction to remove the same, as is the case with known locking devices.

The locking key consists of a short cylindrical pin provided with peripheral grooves forming between them peripheral threads which engage between the threads of the bolt. The key may be provided with a part extending out of the said space for facilitating insertion of the key by hand, moreover the peripheral threads of the key may be serrated or toothed in order to render the locking effect certain even when exposed to vibration. According to the invention also a tool is provided for pressing the key into the aforesaid space.

Reference will now be made to the accompanying illustrative drawings forming part of this specification.

Figure 3:
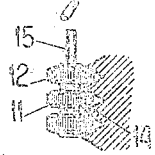
Figure 3A:
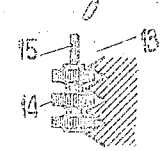

Figs. 3 and 3ᵃ are side elevations illustrating preferred forms of keys.

Figure 4:
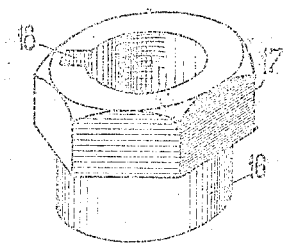

Fig. 4 is a perspective view of the tool for jamming the key between the projecting lug and the bolt.

Figure 5:

Fig. 5 shows the said tool in section.

Figure 6:
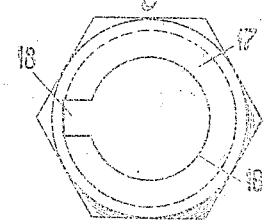

Fig. 6 is a plan of the tool.

Figure 2:
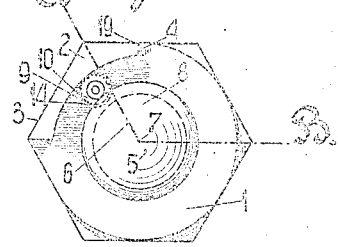
Fig. 2 represents the nut and bolt in plan.

The nut 1 is provided with a marginal lug 2 the outer surface of which preferably coincides with the sides 3 and 4 of the nut, as shown, while the inner surface is curved to a preferably cylindrical form the axis of which is located at the point 5 indicated in Fig. 2.

The cylindrical inner surface of the lug 2 may easily be produced by boring or turning out one face of the nut. Preferably a plane 6 laid through the axis 5 of the cylindrical surface and the axis 7 of the bolt 8 should intersect the corner formed by the sides 3 and 4 of the nut. In this case the narrowest part of the space 9 between the bolt 8 and the lug lies opposite said corner so that the thickest portion of the lug lies opposite said narrowest portion of the space 9.

Figure 1:
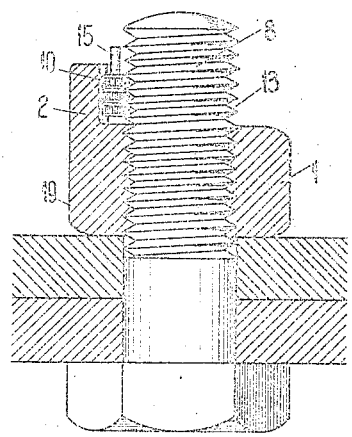
Figure 1 is a cross section corresponding to the line A—B of Fig. 2 showing a nut with inserted key screwed on a bolt and embodying the invention.

The locking key 10 see Figs. 1, 3 and 3ᵃ, consists of a cylindrical pin provided with peripheral grooves 11 forming between them peripheral threads 12. The threads 12 are arranged at equal distances apart, corresponding with the pitch of the thread 13 of the bolt. The said threads may be of rectangular form in section, as shown in Fig. 3ᵃ, or the threads may be turned or cut conically as shown in Fig. 3, so that the inclined edges against the V-shaped threads of the bolt 8. Under no circumstances must the threads of the bolt 8 touch the bottom of the grooves 11 of the key, when the key is placed in locking position. The peripheral threads of the key are provided with teeth 14 which tend to prevent the loosening of the key.

The key may be made of hard material such as steel and may be provided with a projecting part 15 which facilitates the insertion thereof by hand.

As the marginal lug surrounds about one fourth of the bolt's circumference or more, the space 9 will but very gradually grow narrower, so that the key can easily be pressed very tightly in the space thereby locking the nut absolutely. When the key is in locking position it lies in or approximately in the narrowest part of the space 9 so that there are practically no forces tending to drive the key out of the space, as the walls between which the key is wedged are at that part of the space substantially parallel.

In order to unlock the nut, the key is driven out of the space 9 by means of any suitable instrument, however it may with advantage be removed by means of the tool shown in Fig. 4 which may serve also for forcing the key into locking position. The tool consists of a cylindrical ring 16 connected to a head 17 which is preferably of the same form as that of the nut which is to be locked. This head is formed with a central boring of the same diameter as the boring of the ring 16. The cylindrical ring part 16 of the tool is of such dimensions that, when placed over the bolt it can enter between the lug 2 and the bolt 8. The head 17 then extends above the lug 2. The cylindrical ring 16 is formed with a slot 18 which, extends through the ring and through the head 17. When the key 10 has been placed in the space 9 by hand the tool is placed over the bolt 8 so that the key engages the slot 18 therein. The tool can then be turned by the same appliance as that employed for screwing the nut 1 on to the bolt, for example a spanner, and in this way the key 10 can be forced tightly into the space 9. As hereinbefore stated the key then lies in or approximately in the plane 6 going through the axes 5 and 7, Fig. 5, so that the pressure of the key against the lug is exerted on the thickest and consequently the strongest part of the lug, that is to say against the part opposite the corner 19 of the nut.

While the accompanying drawings show the preferred form of nut according to the invention it will be understood that the invention is not limited to the precise form shown.

What we claim is:—

1. A lock nut provided with a marginal lug projecting from one of the end faces thereof the inner surface of said lug being curved so as to form a space between said surface and a bolt protruding through the nut, which space gradually diminishes in width, and a locking key adapted to be inserted and wedged tightly in said space.

2. A lock nut provided with a marginal lug projecting from one of the end faces thereof the inner surface of said lug being curved to cylindrical form so as to form a space between said surface and a bolt protruding through the nut, which space gradually diminishes in width, and a locking key adapted to be inserted and wedged tightly in said space.

3. A lock nut having a polygonal periphery and provided with a marginal lug projecting from one of the end faces thereof the inner surface of said lug being curved so as to form a space between said surface and a bolt protruding through the nut, which space gradually diminishes in width, the space being narrowest opposite one of the corners of the nut, and a locking key adapted to be inserted and wedged tightly in said space.

4. A lock nut provided with a marginal lug projecting from one of the end faces thereof the inner surface of said lug being curved so as to form a space between said surface and a bolt protruding through the nut, which space gradually diminishes in width, and a locking key adapted to be inserted and wedged tightly in said space, said key consisting of a cylindrical member having a plurality of peripheral grooves forming between them a plurality of peripheral threads corresponding in distance from each other with the pitch of the bolt screw thread.

5. A lock nut provided with a marginal lug projecting from one of the end faces thereof, the inner surface of said lug being curved so as to form a space between said surface and a bolt protruding through the nut which space gradually diminishes in width and a locking key adapted to be inserted and wedged tightly in said space, said key consisting of a cylindrical member having a plurality of peripheral grooves forming between them a plurality of peripheral threads corresponding in distance from each other with the pitch of the bolt screw thread, said peripheral threads being serrated.

6. A lock nut provided with a marginal lug projecting from one of the end faces thereof the inner surface of said lug being curved so as to form a space between said surface and a bolt protruding through the nut which space gradually diminishes in width and a locking key adapted to be inserted and wedged tightly in said space, said key consisting of a cylindrical member having a plurality of peripheral grooves forming between them a plurality of peripheral threads of rectangular cross section the pitch of said threads corresponding to the pitch of the bolt screw threads.

7. A lock nut provided with a marginal lug projecting from one of the end faces thereof the inner surface of said lug being curved so as to form a space between said surface and a bolt protruding through the nut which space gradually diminishes in width and a locking key adapted to be inserted and wedged tightly in said space, said key consisting of a cylindrical member having a plurality of peripheral grooves forming between them a plurality of peripheral threads of truncated conical cross section the pitch of said threads corresponding to the pitch of the bolt screw threads.

8. A lock nut provided with a marginal lug projecting from one of the end faces thereof the inner surface of said lug being curved so as to form a space between said surface and a bolt protruding through the nut, which space gradually diminishes in width and a locking key adapted to be inserted and wedged tightly in said space, said key consisting of a cylindrical member provided with a projecting stem at one end and having a plurality of peripheral grooves forming between them a plurality of peripheral threads corresponding in distance from each other with the pitch of the bolt screw thread.

9. In combination, a nut, a bolt upon the threaded shank of which said nut is mounted, said nut having a marginal lug projecting from one end face thereof, the inner surface of said lug being curved to cylindrical form, the axis of the cylindrical surface being located opposite the said lug and beyond the axis of said bolt and the space formed between the cylindrical surface of said lug and the bolt gradually diminishing in width, and a locking key adapted to be wedged between the cylindrical surface of said lug and said bolt.

In testimony whereof we have hereunto set our hands in presence of two subscribing witnesses.

CHRISTIAAN CORNELIS VAN DER VALK.
FRANÇOIS MARINUS VAN PANTHALEON
                       BARON VAN ECK.

Witnesses:
  CAREL OTTO HEUVELINK,
  J. A. BOWMAN.